United States Patent Office 3,049,403
Patented Aug. 14, 1962

3,049,403
PROCESS FOR PRECIPITATING READILY FILTERABLE RARE EARTH HYDROXIDES
Pawel Krumholz, Rua Maestro Elias Lobo 241,
Sao Paulo, Brazil
No Drawing. Filed Aug. 25, 1958, Ser. No. 758,649
Claims priority, application Brazil Sept. 2, 1957
5 Claims. (Cl. 23—22)

The precipitation of rare earth hydroxides is known as providing an efficient means of separating rare earths. This method is particularly efficient for the separation of lanthanum from all other rare earths. Precipitation is usually carried out at boiling temperature, yielding a dense precipitate of good filterability. We found, however, that the separational efficiency is better, if the hydroxides are precipitated at temperatures below 50° C., in which case the precipitate is very voluminous and filters extremely slowly.

The present invention is directed to an improved process of separating rare earths by precipitation of their hydroxides, which while maintaining the simplicity and higher efficiency of precipitation at lower temperatures yields very dense and readily filtrable precipitates.

According to the present invention, a solution of rare earth salts, preferentially of rare earths chlorides is precipitated at a temperature of between 25° C. and 50° C. with a solution of an alkali or of ammonium hydroxide in the presence of an aliphatic carboxylic acid, of low molecular weight. The mechanism of action of the carboxylic acid is not quite clear and consists possibly in the formation of basic salts of the carboxylic acid. The invention itself, however, is independent of any explanation of the phenomenon and is based exclusively on its efficiency, which is rather surprising. Whereas in absence of a carboxylic acid the precipitate of the hydroxide contains 20%–25% of oxides on wet basis and filters extremely slowly, addition of a carboxylic acid such as formic acid or acetic acid increases the oxide content up to 50% and the filtration rate by a factor of 10 to 100. Those facts clearly show the economic importance of the improved process, object of this invention.

The efficiency of the addition of a carboxylic acid with regard to the density, oxide content and filterability of the precipitated hydroxides seems to be restricted to aliphatic carboxylic acids of less than four carbon atoms. Formic acid, acetic acid and propionic acid are very efficient as additives. Substituted carboxylic acids such as glycolic acid or monochlor-acetic acid are quite efficient. Oxalic acid similarly has a noticeable effect. Higher fatty acids such as butyric acid or valeric acid do not materially improve the physical properties of the precipitated hydroxides. The same is true of aromatic acids such as benzoic acid or salicylic acid and for higher substituted aliphatic acids such as tartaric acid or citric acid.

The carboxylic acids are preferably added to the solution of the alkali or ammonium hydroxide used as precipitating agent, in such a quantity as to represent between 5 and 15% of the normality of the alkali. The most suitable concentration of the carboxylic acid depends somewhat on the composition of the solution, as well as on the concentration of the alkali, but remains mostly within the indicated limits. It was found, and it is another object of this invention, that such amounts of the carboxylic acids must be used only in the precipitation of the first 20%–35% of the rare earths mixture subjected to the precipitation process. The amount of the carboxylic acid in relation to the alkali may be reduced for the further precipitations and precipitates with excellent physical properties may be obtained even without any further addition. Further addition is superfluous if precipitation is continued by introducing gaseous ammonia, preferably mixed with air, into the solution.

The following examples are given for illustrative purposes without limiting the invention to the details set forth therein.

EXAMPLE I

A mixture of rare earth oxides as naturally occurring in monazite, but freed from its cerium content was dissolved in hydrochloric acid and brought to a concentration of 135 g. total oxides per liter. Two liters of the solution were placed in a beaker provided with a turbomixer and baffle plates, heated to 35° C. and precipitated by slow addition of 2 molar ammonium hydroxide, or 2 molar sodium hydroxide, respectively. The quantity of the alkali was such as to precipitate about 30% of the total oxide content. In the first experiment the alkali was used without any addition. The other experiments received additions of various amounts of carboxylic acids. The results are summarized in Table I. All experiments were carried out under identical conditions and all precipitates filtered on vacuum filters with the same surface, so that filtration conditions are strictly comparable.

Table I

| Precipitant | Addition Acid | Normality relative to precipitant | Time of Filtration | Percent oxide in wet cake |
|---|---|---|---|---|
| $NH_3$ | No | | >6 hours | 20–30 |
| $NH_3$ | Formic | 0.05 | 25 min | 35 |
| $NH_3$ | do | 0.1 | 6 min | 46 |
| $NH_3$ | Acetic | 0.025 | 80 min | 25 |
| $NH_3$ | do | 0.05 | 20 min | 29 |
| $NH_3$ | do | 0.1 | 10 min | 38 |
| $NH_3$ | Propionic | 0.1 | 30 min | 36 |
| $NH_3$ | Monochloracetic | 0.1 | 40 min | 29 |
| $NH_3$ | Glycolic | 0.1 | 30 min | 48 |
| $NaOH$ | No | | >24 hours | 20–30 |
| $NaOH$ | Formic | 0.1 | 1 hour | 38 |
| $NaOH$ | Acetic | 0.1 | do | 33 |

The oxide content of the hydroxides, precipitated without addition of a carboxylic acid varies within large limits, due probably to the very long time of filtration. The filtrability itself depends on imperceptible variations of the conditions during the precipitation. Contrary thereto, in the experiments performed with the addition of a carboxylic acid, filtration times and oxide content of the cakes are quite reproducible.

EXAMPLE II

The oxides used in this example had the following composition: 34% $La_2O_3$; 5% $Pr_2O_3$; 25% $Nd_2O_3$; 12% $Sm_2O_3$; 16% $Gd_2O_3$ and 8% $Y_2O_3$ and yttrium earth oxides. 360 kg. of the oxides were dissolved in the minimum amount of hydrochloric acid and brought to a volume of 2800 liters. The solution was placed in a rubber lined vessel provided with a turbo agitator and suitable baffles and heated to 35° C. Thereafter 3 M ammonia, containing ammonium acetate in a molarity of 0.3, was introduced by means of spray nozzles during two hours in a quantity necessary to precipitate 120 kg. of the oxides.

The mixture was filtered in a wooden filter press having a volume of 270 liters and washed with a small amount of water. The filtration time was about 1 hour and the oxide content of the wet cake about 33%.

The filtrate of the first precipitation was precipitated under the same conditions as in the first precipitation, reducing however the normality of the ammonium acetate to 0.1. The filtration time of the second precipitate was substantially the same as that of the first precipitation. The oxide content of the wet cake was about 32%. The rare earth remaining in the solution and consisting chiefly of lanthanum were recovered by precipitating rare earths carbonates. Table II gives the composition of the three fractions, as compared with that of the original material.

Table II

| Fraction | $La_2O_3$ | $Pr_2O_3$ | $Nd_2O_3$ | $Sm_2O_3$ | $Gd_2O_3$ | $Y_2O_3$ [1] |
|---|---|---|---|---|---|---|
| | Percent | Percent | Percent | Percent | Percent | Percent |
| Original | 34 | 5 | 25 | 12 | 16 | 8 |
| I | 4 | 3 | 20 | 12 | 32 | 20 |
| II | 12 | 7 | 44 | 14 | 18 | 5 |
| III | 84 | 5 | 10 | 1 | | |

[1] Includes the oxides of yttrium earths.

EXAMPLE III

The oxides used in this example had the following composition: 44% $La_2O_3$, 1% $CeO_2$, 34% $Nd_2O_3$, 9.5% $Pr_2O_3$, 5.5% $Sm_2O_3$ and 6% $Y_2O_3$ with yttrium earth oxides. 400 kg. of the oxide mixture were dissolved in the minimum amount of hydrochloric acid and brought to a volume of 2900 liters. Cerium was removed by precipitation in known manner with potassium permanganate and alkali and the filtered solution precipitated as in the preceding example with 2 molar ammonia, containing ammonium acetate in a molarity of 0.15. The first fraction corresponded to 31% of the total oxide content. Filtration time was 80 minutes and the oxide content of the wet cake 39%. Two further fractions of 26% and 10% respectively were precipitated by introducing gaseous ammonia mixed with ten times its volume of air into the solution, without further addition of acetate. The filtration time was 1 hour and 50 minutes, respectively, and the oxide content of the wet filter cakes 40% and 34%, respectively. Lanthanum was recovered from the filtrate of the last fraction by precipitation with ammonium carbonate.

Table III gives the composition of the fractions as compared with the composition of the original material.

Table III

| Fraction | $La_2O_3$ | $Pr_2O_3$ | $Nd_2O_3$ | $Sm_2O_3$ | $Y_2O_3$ [1] |
|---|---|---|---|---|---|
| | Percent | Percent | Percent | Percent | Percent |
| Original | 44.5 | 9.5 | 34.5 | 5.5 | 6 |
| I | 58 | 10 | 50 | 15 | 17 |
| II | 18 | 18 | 59 | 3.5 | 1.5 |
| III | 54 | 30 | 15 | 1 | |
| IV | 96.7 | 1.3 | 2 | | |

[1] Includes gadolinium oxide and yttrium earth oxides.

If such precipitations, as described in Examples II and III are performed without the addition of acetic acid or another carboxylic acid filtration times are of the order of 8 to 24 hours. The precipitates have an oxide content of 20 to 25% and a specific volume at least 50% greater than the volume of the precipitates obtained in the presence of a carboxylic acid. The precipitates thus retain a considerable amount of the solution, and as washing is still slower than the filtration the efficiency of the separation is lowered.

The economic advantage of the improved process of the present invention is thus clearly shown and consists essentially in a very considerable reduction of the time necessary for the precipitation and in the corresponding increase of the production capacity of a given installation.

What is claimed is:

1. In a method of precipitating rare earth hydroxides from a solution of rare earth chlorides, the improvement in the precipitation of more easily filterable precipitates which comprises reacting an aqueous solution of a mixture of rare earth chlorides at a temperature between 25° and 50° C. with an aqueous solution containing an alkaline precipitating agent selected from the group consisting of alkali metal and ammonium hydroxides and also containing in solution an aliphatic carboxylic acid of less than four carbon atoms in an amount equivalent in normality to 5–15% of the concentration of said alkaline precipitating agent in normality, whereby said rare earths are precipitated as hydroxides in the form of a dense, readily filterable precipitate.

2. In a method of precipitating rare earth hydroxides from a solution of rare earth chlorides, the improvement in the precipitation of more easily filterable precipitates which comprises reacting an aqueous solution of a mixture of rare earth chlorides at a temperature between 25° and 50° C. with an aqueous solution containing an alkaline precipitating agent selected from the group consisting of alkali metal and ammonium hydroxides and also containing in solution an aliphatic carboxylic acid of up to four carbon atoms selected from the group consisting of formic acid, acetic acid, propionic acid, glycolic acid, monochloroacetic acid and oxalic acid in an amount equivalent in normality to 5–15% of the concentration of said alkaline precipitating agent in normality, whereby said rare earths are precipitated as hydroxides in the form of a dense, readily filterable precipitate.

3. In a method of precipitating rare earth hydroxides from a solution of rare earth chlorides the improvement in the precipitation of more easily filterable precipitates which comprises reacting an aqueous solution of a mixture of rare earth chlorides at a temperature between 25 and 50° C. with an aqueous solution containing an alkaline precipitating agent selected from the group consisting of alkali metal and ammonium hydroxides and also containing in solution formic acid in an amount equivalent in normality to 5–15% of the concentration of said alkaline precipitating agent in normality, whereby said rare earths are precipitated as hydroxides in the form of a dense, readily filterable precipitate.

4. In a method of precipitating rare earth hydroxides from a solution of rare earth chlorides the improvement in the precipitation of more easily filterable precipitates which comprises reacting an aqueous solution of a mixture of rare earth chlorides at a temperature between 25 and 50° C. with an aqueous solution containing an alkaline precipitating agent selected from the group consisting of alkali metal and ammonium hydroxides and also containing in solution acetic acid in an amount equivalent in normality of 5–15% of the concentration of said alkaline precipitating agent in normality, whereby said rare earths are precipitated as hydroxides in the form of a dense, readily filterable precipitate.

5. In a method of precipitating rare earth hydroxides from a solution of rare earth chlorides the improvement in the precipitation of more easily filterable precipitates which comprises reacting an aqueous solution of a mixture of rare earth chlorides at a temperature between 25 and 50° C. with an aqueous solution containing an alkaline precipitating agent selected from the group consisting of alkali metal and ammonium hydroxides in 2–3 molar concentration and also containing in solution an aliphatic carboxylic acid of up to four carbon atoms selected from the group consisting of formic acid, acetic acid, propionic acid, glycolic acid, monochloroacetic acid and oxalic acid in an amount equivalent in normality to 5–15% of the concentration of said alkaline precipitating agent in normality, whereby said rare earths are precipitated as hydroxides in the form of dense, readily filterable precipitate.

(References on following page)

References Cited in the file of this patent

UNITED STATES PATENTS

| | | |
|---|---|---|
| 1,371,741 | Dietsche | Mar. 15, 1921 |
| 2,815,264 | Calkins et al. | Dec. 3, 1957 |

FOREIGN PATENTS

| | | |
|---|---|---|
| 892,536 | France | Jan. 10, 1944 |
| 9,534 | Great Britain | of 1914 |

OTHER REFERENCES

Vickery, R. C.: "Chemistry of the Lauthorons," Academic Press, Inc., N.Y., 1953, pages 92–96.

Mellor: "Comprehensive Treatise on Inorg. and Theor. Chem.," vol. 5, pages 561, 562 and 568 (1924), Longmans, Green and Co., N.Y., N.Y.

Boisbaudran: Article in Comptes Rendus, vol. 111, pages 393–95 (1890).